F. W. ROBINSON.
Thrashing Machine.
No. 235,897.  Patented Dec. 28, 1880.
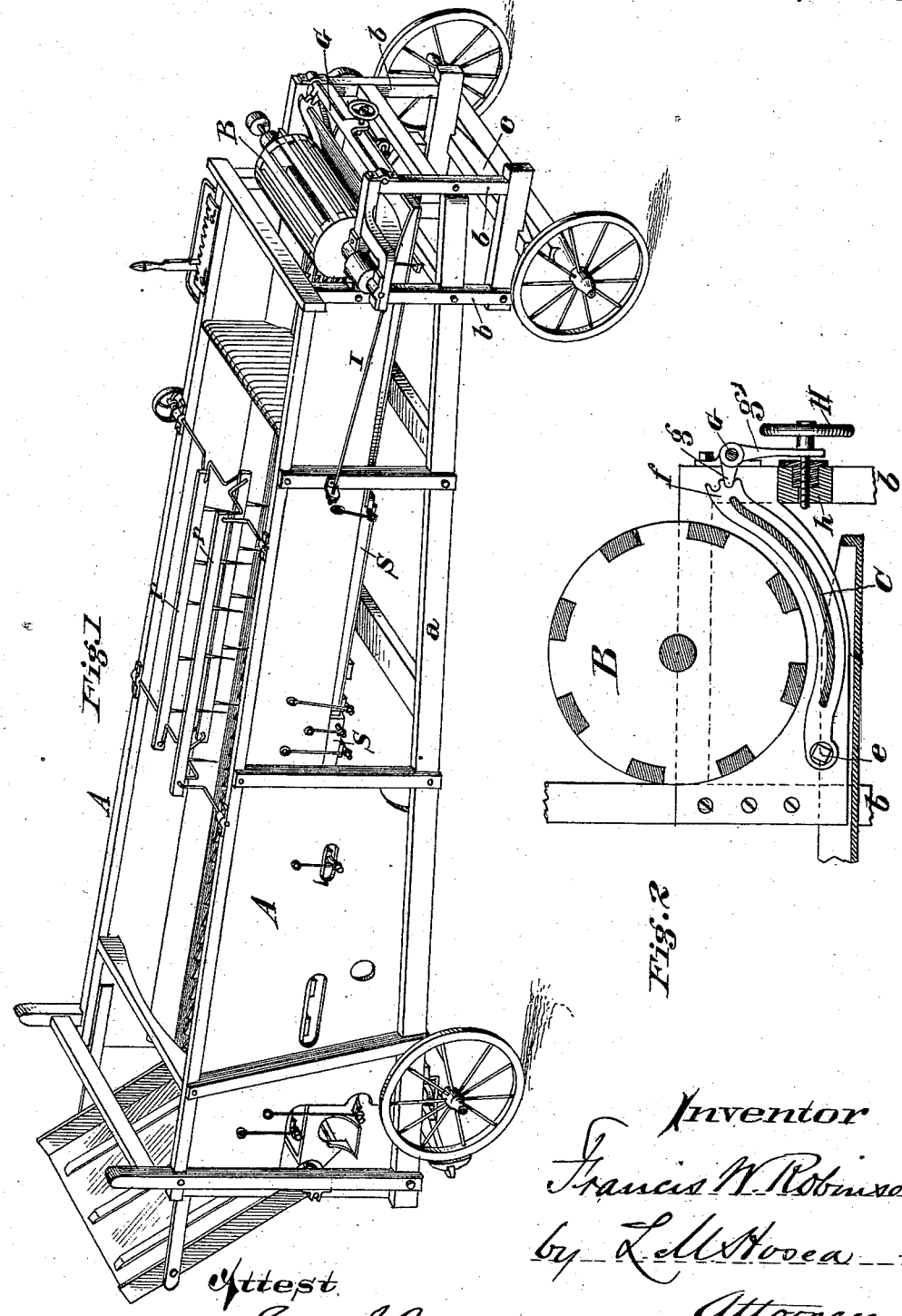

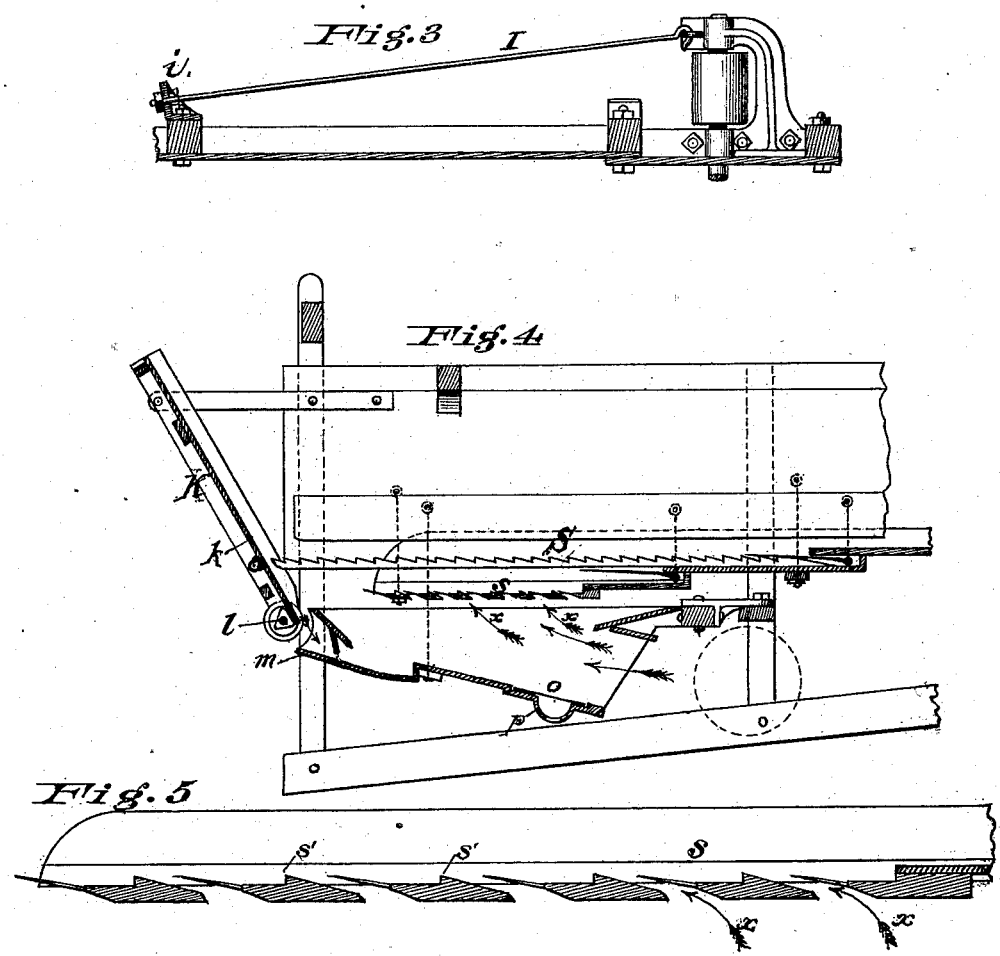

UNITED STATES PATENT OFFICE.

FRANCIS W. ROBINSON, OF RICHMOND, INDIANA.

THRASHING-MACHINE.

SPECIFICATION forming part of Letters Patent No. 235,897, dated December 28, 1880.

Application filed January 12, 1880.

*To all whom it may concern:*

Be it known that I, FRANCIS W. ROBINSON, of Richmond, Wayne county, Indiana, have invented certain new and useful Improvements in Thrashing-Machines, of which the following is a specification, reference being had to the accompanying drawings, illustrating the same.

My invention relates to that class of grain and seed thrashers or separators which, from their method of operation, are termed "vibrators;" and its object is to improve the efficiency of various parts of such machines, as will be hereinafter fully set forth.

In the drawings, Figure 1 is a perspective view of my improved thrashing-machine, showing "pickers" for separating the grain and seed from the straw and assisting the passage of the straw to the rear. Fig. 2 is a vertical cross-section, somewhat enlarged, of the thrashing-cylinder and the "concave" with its means of adjustment. Fig. 3 is an inverted plan view of the projecting end of the cylinder-shaft and its bearings and the detachable strengthening-brace in position. Fig. 4 is a sectional elevation (side) of the rear portion of the machine, showing the vibrating screens and connecting parts, the stacker-floor, and the lengthened tailing-spout. Fig. 5 is a detail cross-section of the slats constituting the screen.

In a machine of this class it is especially desirable not only that it shall properly perform its work in separating the grain or seeds from the refuse, but also that it shall possess as little weight as possible, and at the same time be strong and capable of being readily moved from place to place in the fields and adjusted in any desired position convenient for the work performed. With a view of combining these advantages, I construct the body or framework with its sides A converging from rear to front and its lower sills, *a*, inclined upward from rear to front, resting upon the vertical braces *b b*, which, with their connecting or cross sills, form a support for the cylinder B, concave C, and connecting parts. The vertical braces *b* project below the sills *a*, and are supported from the bolster *c*, which rests upon the axle.

As shown in the drawings, the rakes, usually three in number, are mounted on parallel crank-shafts having their cranks set at equal angles with each other. The rakes are thus parallel rods provided with picker-teeth extending below, and operate from front to rear upon the straw, tearing apart and separating the straw and aiding its movement backward. As the column of straw moves to the rear it travels a constantly-widening path, which, in connection with the separating movement of the picker-rakes and the agitating movements of the shaking-pans, materially aids in loosening the column of straw and sifting out the grain.

In machines of this kind it is necessary that the concave should be adjustable with reference to the periphery of the cylinder. This I accomplish by pivoting the sides of the concave at the rear to the side framing at *e*, as shown in Fig. 2. At the front ends, *f*, of the side pieces of the concave are recesses, which engage with fingers or detents *g* upon a cross-bar, G, journaled in the side braces, *b*, and extending across the front of the machine. From the center of the cross-bar G a lip, *g'*, extends downward, through which passes an adjusting-screw, H, engaging a nut in the cross-bar *h*, by which means the concave is rendered adjustable in relation to the cylinder, such result being especially due to the series of notches in the front ends of the side bars of the concave, into either of which the fingers or detents *g* can be arranged. Further, the tension of the torsional spring-bar G is regulated and controlled by the same adjusting-screw which actuates the lip *g'* of the bar. The cross-bar G is made small enough to yield by its torsional elasticity in case the parts become choked by bunches of grain, and so enlarge the passage-way temporarily, and thus prevent breakage of the parts.

I have heretofore secured by Letters Patent the addition of a strengthening-brace to the outer bearing of the driven pulley upon the projecting cylinder-shaft; but this construction, while useful, is objectionable, as interfering with the adjustment or removal of the driving-belt.

My present improvement consists in making the brace detachable from the journal-bearing, in order to allow the removal or adjustment of the belt, and is clearly shown in Figs. 1 and 3. The brace I is hook-shaped at its forward end, and is inserted in an open ring secured to and underneath the journal-bearing. The rear end of the brace I passes through a cleat, i, attached to the side of the framing, and is provided with a screw-thread and set-nuts at each side of the cleat for adjustment of the brace. This construction enables the brace to be removed from the journal-bearing by loosening the set-nuts when it is desired to remove the driving-belt, and is as easily replaced in position to prevent the bending of the cylinder-shaft or heating the journal.

In machines of this kind the straw, after leaving the thrashing-cylinder, is carried backward by the vibrating movement of the straw-shaker S and the action of the rakes r to the straw-stacker in rear. By the agitation of the straw the grain and chaff are sifted out and fall upon a vibrating screen beneath, through which currents of air are caused to flow for the purpose of separating the chaff from the grain.

In order to give proper direction to the currents of air, I construct the slats of the screen S of the irregular lozenge shape in cross-section shown in Figs. 4 and 5. The screen S is a component part of the straw-shaker, and partakes of its forward and backward movement, the object being to facilitate the passage of the straw and chaff to the rear.

It will be seen that the passages between the slats, owing to the inclination of their adjacent sides, are inclined to the rear, and deflect the currents of air in that direction, as shown by the arrows x x, while the barb-shaped projections s', or, more properly speaking, ridges, upon the upper surface of the slats, assist the movement in the same direction, and therefore aid the blast in separating and removing the chaff.

In the process of thrashing grain with a machine provided with vibrating or shaking fans S, the column of straw is delivered to the straw-stacker K with uniform speed, but is, by the superior speed of the straw-carrier, broken at that point, thus allowing the imprisoned grain to escape and fall through between the slats of the carrier. I use a floor beneath the upward-moving slats of the carrier, to which a shaking or vibrating motion may be given by knockers or cams l, secured upon the actuating-shaft of the straw-carrier. By this means the escaping grain is sifted from the straw and allowed to pass downward into the tailing-spout m, which, for this purpose, is extended, as shown in Fig. 4.

In a machine intended to thrash both grain and flax, or other seeds, a screen is used at the bottom of the shoe for the purpose of screening wheat, which it is necessary to remove or cover up in the thrashing of flax or other small seeds. Many disadvantages attend the use of this screen as ordinarily employed—for instance, the escape of air, whereby the blast is weakened, and the inconvenience and loss of time suffered in taking it out in the ordinary way. My improvement in this respect consists in providing a removable screen, o, in connection with a tight bottom, p, at a suitable distance beneath it, which prevents waste of the blast, and at the same time carries the screenings back to a suitable receptacle, and in arranging the shoe and screen as shown, whereby the screen may be readily removed from the outside and replaced by a solid shield or floor when thrashing flax or other seed. The screen is arranged to be removed and taken out beneath the frame of the machine, and is held in position by any suitable fastening.

Having described my invention, I claim and desire to secure by Letters Patent—

1. The concave C, pivoted at its rear end beneath the thrashing-cylinder B and having the front free ends of its side pieces constructed with the series of notches or recesses, in combination with the yielding or torsional spring cross-bar G, having the rearwardly-projecting fingers g, for engaging any of the said notches or recesses, the lip g', depending from the center of said cross-bar, and the adjusting-screw H, passing through the end of the depending lip, substantially as and for the purpose described.

2. The combination, with the external journal-bearing of the cylinder-shaft and its pulley, of the strengthening-brace I, detachably connected with the journal-bearing at one end, and at the other end adjustably and removably attached to a cleat or projection, i, on the frame of the machine, as shown and described, whereby the said brace may be readily detached from the journal-bearing when it is desired to remove the driving-belt, as set forth.

In testimony that I claim the foregoing as my invention I have hereunto set my hand this 31st day of December, 1879.

FRANCIS W. ROBINSON.

Witnesses:
C. F. HESSER,
L. M. HOSEA.